United States Patent [19]

Davis et al.

[11] 4,332,984
[45] Jun. 1, 1982

[54] ACTIVE SPEECH NETWORK CIRCUIT FOR A TELEPHONE SET

[75] Inventors: Paul C. Davis, Reading, Pa.; Raymond G. Jackson, Indianapolis, Ind.; Kenneth F. Sodomsky, Reading, Pa.; Dennis L. Whitson, Blue River Township, Hancock County, Ind.

[73] Assignee: Bell Telephone Laboratories, Incorporated, Murray Hill, N.J.

[21] Appl. No.: 103,404

[22] Filed: Dec. 13, 1979

[51] Int. Cl.³ .............................................. H04M 1/00
[52] U.S. Cl. ................................ 179/81 R; 179/81 A
[58] Field of Search ................ 179/81 R, 81 A, 84 R, 179/84 VF, 16 F, 170.2, 170.8

[56] References Cited

U.S. PATENT DOCUMENTS

| | | | |
|---|---|---|---|
| 3,546,395 | 12/1970 | Schuh | 179/81 A |
| 3,973,082 | 8/1976 | van der Plaats | 179/81 R |
| 3,989,902 | 11/1976 | Cowpland | 179/81 R |
| 4,071,713 | 1/1978 | Senzer | 179/81 A |
| 4,143,247 | 3/1979 | Yoshitoshi et al. | 179/81 R |

*Primary Examiner*—Robert S. Tupper
*Assistant Examiner*—J. A. Popek
*Attorney, Agent, or Firm*—S. R. Williamson

[57] ABSTRACT

In a subscriber telephone set, an active speech network provides a sidetone signal and for equalization of the transmit and receive signals at the tip and ring line port and also maintains the dc voltage at a substantially constant level at this port. The network is compatible with conventional telephone sets and operation on long loops in parallel with such sets is provided for. Internal circuitry (320) within the network check both loop current and tip-to-ring voltage to ensure that both are of a magnitude sufficient for a tone signaling dial (301) to properly generate tone signals before enabling the dial.

28 Claims, 4 Drawing Figures

4,332,984

ACTIVE SPEECH NETWORK CIRCUIT FOR A TELEPHONE SET

BACKGROUND OF THE INVENTION

1. Technical Field

This invention relates to telephone set voice circuits and, more particularly, to voice circuits for electronic telephone sets employing active speech networks that are powered from a central office line.

2. Description of the Prior Art

Two wire subscriber circuits in telephone systems are particularly arranged in hybrid type configuration with the transmitter and receiver unit mutually conjugate. Because of this arrangement, signals generated either in a transmitter or receiver are substantially or entirely muted in the other. This arrangement has traditionally been accomplished with a hybrid induction coil. One-half of the signal power generated by the transmitter, however, is dissipated in the balancing network of the hybrid induction coil resulting in low transmitting efficiency.

As a result of this power loss, as well as the undesirably large bulk and high cost of telephone set hybrid induction coils, voice circuits that avoid the conventional need for induction hybrid coils have been devised. One example of such a circuit is shown in U.S. Pat. No. 3,546,395, issued to P. O. Schuh on Dec. 8, 1970. The need for inductive hybrid coils is avoided through a circuit that employs the feedback loop of a transistor amplifier to provide sidetone balance.

In connection with the development of an all-electronic telephone set, it is desirable to provide an active speech network for use in these telephones that allows parallel operation with conventional hybrid coil telephones on long loop lengths. Current consumption for the active speech network must therefore be low to allow sufficient current for operation of the hybrid coil telephone. Another consideration is the power supply constraints from other electronic circuits within the electronic telephone. Circuits, such as an electronic dial and a linear transducer for the transmitter, require that the speech network maintain a substantially constant network tip-to-ring voltage and equalize transmission based on network loop current.

SUMMARY OF THE INVENTION

In accordance with the present invention, an active speech network provides a sidetone signal and equalization for transmit and receive signals at the tip and ring line port and also maintains the voltage at a substantially constant level at this port. The active speech network also provides power to a tone signaling dial in a telephone. Circuitry within the speech network senses both the loop current and the tip-to-ring voltage to determine if, for example on long loops with multiple sets off hook, both are of a magnitude sufficient for a dial to properly generate tone. When both conditions are met, the dial is enabled and will generate tone when a button on its keypad is depressed.

In accordance with the invention, when dialing is desired and a button is depressed, the transmitter is inhibited and the receiver is muted thereby. In addition, the telephone set operating voltage is allowed to increase during dialing. By drawing a portion of the loop current through a fixed resistor, the set voltage can be changed in much less than a millisecond without changing the voltage on a capacitor, which would require a much longer time period.

DETAILED DESCRIPTION

Figure 1:
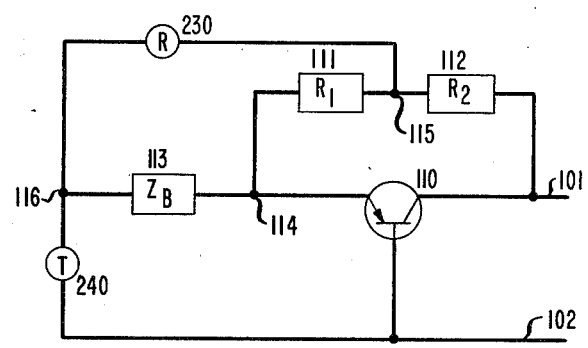
FIG. 1 shows the generalized circuit diagram of a prior art arrangement of an active speech network employing a transistor feedback loop for sidetone balance and equalization.
Figure 4:
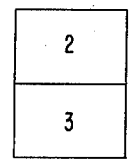
FIG. 4 shows the spatial arrangement of FIGS. 2 and 3.

FIG. 1 shows by way of example an arrangement of an active speech network to which the invention can be applied. This prior art arrangement is described in U.S. Pat. No. 3,546,395, issued to P. O. Schuh on Dec. 8, 1970. Such an arrangement avoids the conventional need for inductive hybrid coils by employing the feedback loop of a transistor-amplifier circuit to provide sidetone balance and gain equalization to compensate for changes in line impedance.

The circuit arrangement is a Y-network in which the transmitter 240 is an ideal voltage source connected in the base-emitter circuit of a transistor 110. The base collector terminals of transistor 110 are connected between terminals 101 and 102 of a tip and ring line. One pair of resistor networks 111 and 112 are connected in series across the emitter-collector terminals of transistor 110, and the receiver 230 is connected between terminal 115 at the junction of the resistor networks and terminal 116 at the emitter side of the transmitter 240. An additional impedance network 113 is bridged between the terminal 116 and terminal 114 at the junction of resistor network 111 with the emitter of the transistor 110.

In operation, outgoing speech signals from the transmitter 240 are coupled through the impedance network 113 to transistor 110. The current in the collector circuit of transistor 110 appears at terminal 101, resulting in a voltage across terminals 101 and 102 which constitutes the transmitting output into the line.

The voltage across terminals 101 and 102 establishes a current through resistors 111 and 112, which is coupled back into the transistor 110, resulting in a feedback current from the collector of transistor 110 into terminal 101. This feedback current results in a lossless transmission from the current established in transistor 110 by the transmit speech signal.

Owing to the common base configuration of transistor 110, there is a negligible ac voltage drop between terminals 102 and 114. Resistors R1 and R2 are so proportioned that the resulting voltage drop is equal to the voltage gain between terminals 116 and 101, thereby providing antisidetone performance. Under normal transmit conditions there is a null between terminals 115 and 116.

The signal received from the line across terminals 101 and 102 establishes a voltage between terminals 102 and 115 which is distributed between the receiver 230 and the transmitter 240. Current loss which would normally occur because of the relatively low resistance of resistor 111 is avoided as a result of the feedback loss coupling into transistor 110. A portion of the receive voltage that appears across the transmitter 240 is fed back into the transistor 110 through the impedance network 113, thereby effectively decreasing the loss as a result of the feedback path through transistor 110. The impedance network 113 has a magnitude less than but a phase angle substantially identical to that of the line impedance across terminals 101 and 102. Thus sidetone balance with transmit voltage gain is provided for by the active speech network.

Figure 2:
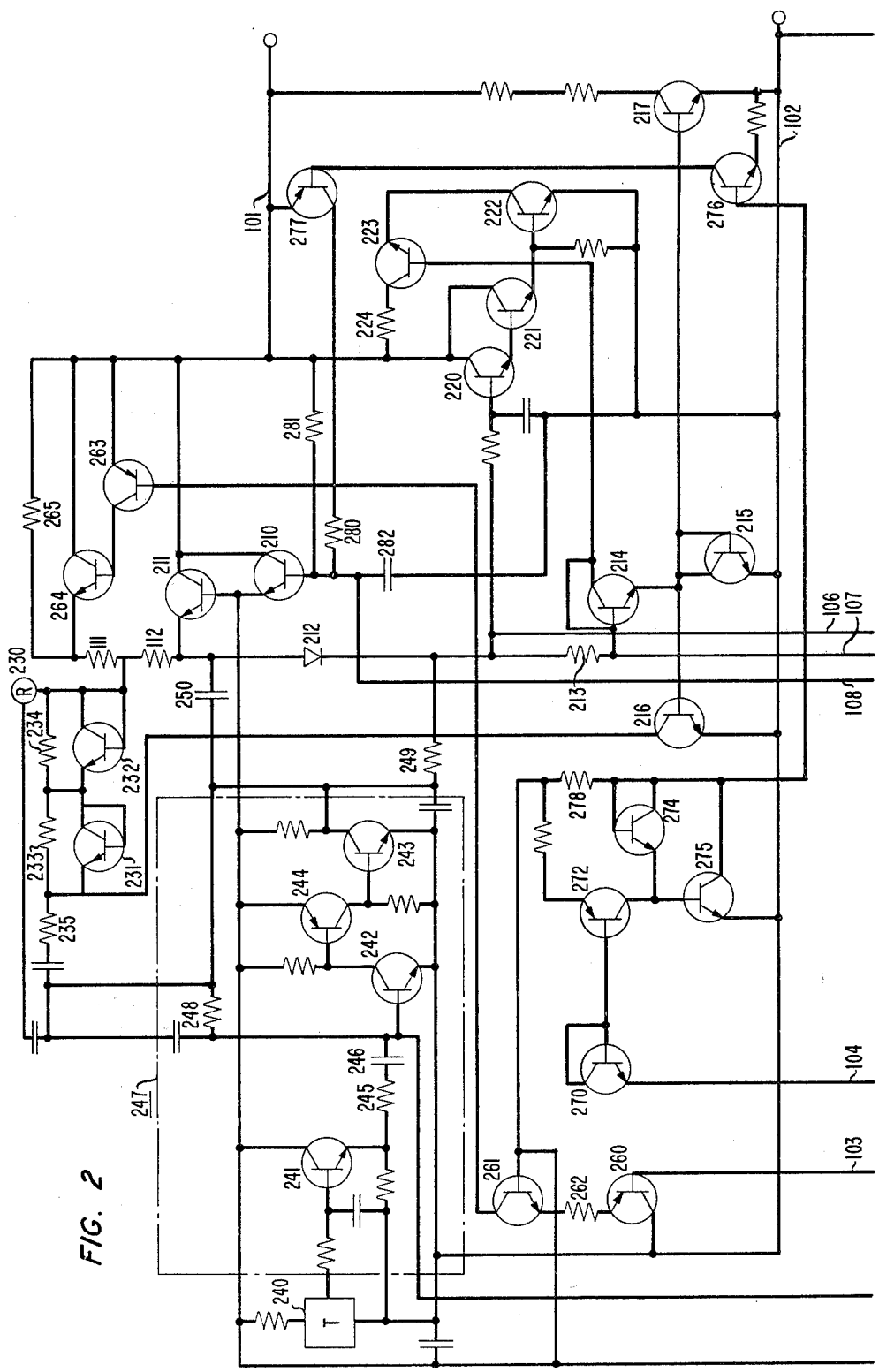
FIGS. 2 and 3 show a schematic circuit diagram of an active speech network of the type in FIG. 1 adapted in accordance with the present invention.
Figure 3:
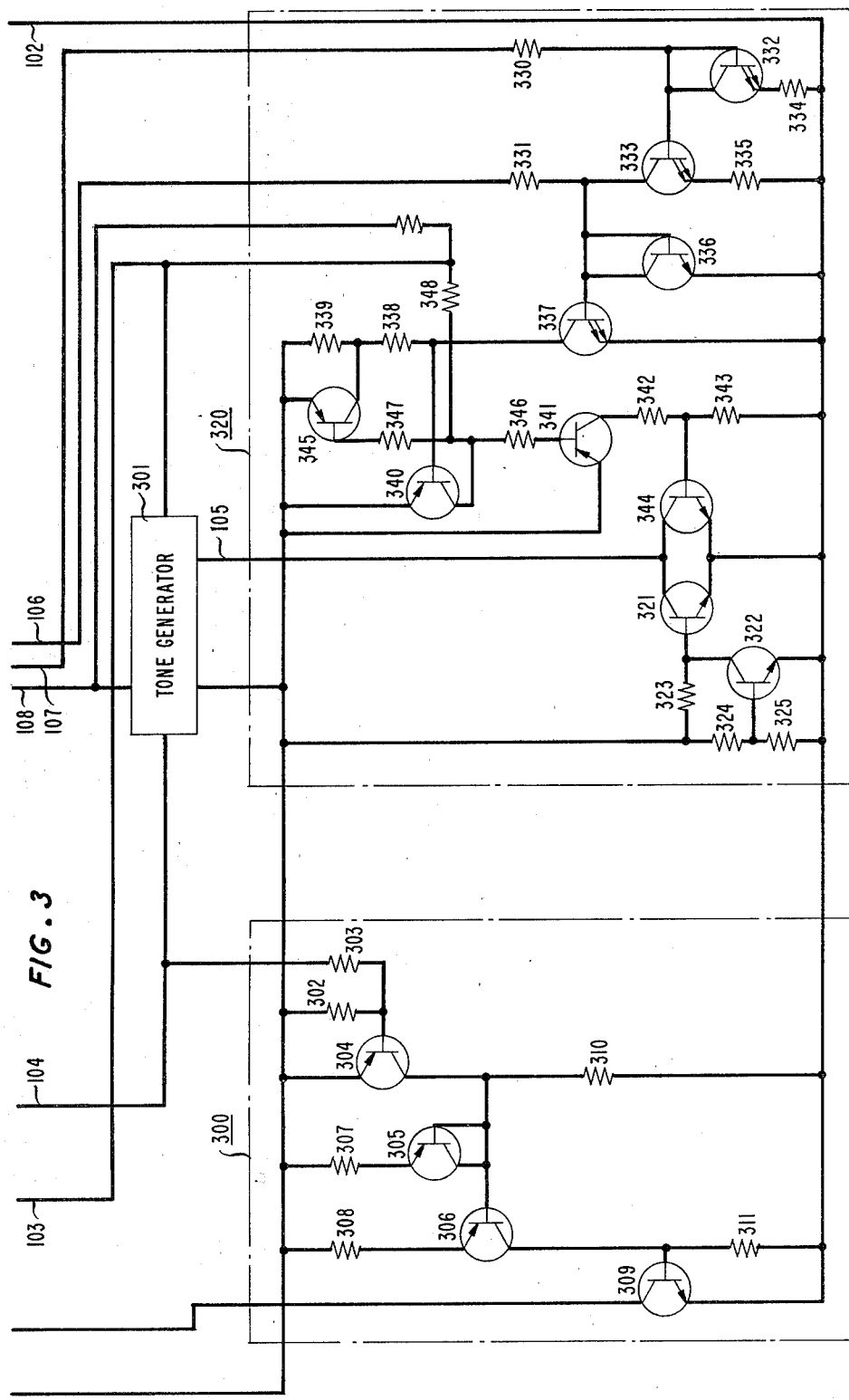

Referring to FIGS. 2 and 3, there is shown the circuit diagram of the active speech network of FIG. 1 adapted in accordance with the present invention. The telephone line input is over lines 101 and 102. The main current control path from the input lines through the active network is from line 101 through the Darlington pair transistors 210 ad 211, diode 212, resistor 213, diode-connected transistors 214 and 215 to the line 102 or common. Current appearing at the emitter terminal of transistor 214 is used to drive a current mirror consisting of transistors 216, 215, and 217. The size of these transistors is such that the emitter current in transistor 217 is the same as the emitter current in transistor 215. Emitter current in transistor 216 is about 21 times smaller than the current in transistor 215. In that transistor 217 is the same size as transistor 215 and is bridged across the lines 101 and 102, about a half the line current also flows through this transistor.

A voltage source of four and one-half $V_{be}$ in the speech network circuit allows for parallel operation on long loop lengths with a conventional hybrid coil telephone having a carbon transmitter. The four $V_{be}$ is from transistors 210, 211, 214, and 215. The one-half $V_{be}$ is from the germanium diode 212. Thus, the voltage from tip to ring is four and one-half $V_{be}$ plus some small voltage drop across resistor 213 which is 15 ohms. This essentially appears as a voltage source if a voltage versus current characteristic of this circuit is examined. This is significant in that a conventional hybrid coil telephone set with a carbon transmitter has a very low impedance for dc resistance and therefore a large part of the available current flows through it. A typical voltage versus current plot of the conventional telephone, for example, would reveal a nonlinear characteristic that approaches 200 ohms at the low end. The voltage versus current characteristics of a telephone set having the active speech network in accordance with this invention advantageously appears as a voltage source at very low currents due to the $V_{be}$ described above and then with a very low slope.

There is another 15 ohm resistor in the telephone set in a surge protector circuit (not shown). The slope of this curve then becomes one-half times the 15 ohm resistor 213 because the load current is divided between transistor 215 and 217 plus the additional 15 ohms in the surge protector circuit, thus yielding a 22½ ohm slope. The intersect at the lower range of operation is at 4½ $V_{be}$. When a polarity guard circuit is used this voltage will increase by the drop of the polarity guard. As low a voltage operation as possible is desirable so that operation in parallel wih a conventional hybrid coil telephone set can be maintained on longer loops. The two telephone sets will have the same voltage across them when they are operating in parallel, so as very low current the sets will share such that the hybrid coil set will receive most of the current.

A toll grade battery high current shunt is included in the active speech network circuit. As the current gets high, as is the case on some very short loops, voltage starts to build up across resistor 213. When this voltage gets up to a full $V_{be}$, then the string of transistors 220, 221, and 222 turn on. There are three $V_{be}$ cross these transistors and three $V_{be}$ across resistor 213, transistors 214 and diode 212. With this shunt turned on, any excess loop current passes therethrough preventing any additional voltage buildup. Transistor 223 and resistor 224 are for keeping the output impedance of this shunt high.

There are two means of equalization in the speech network circuit. One is the shunt impedance from tip to ring, lines 101 to 102, that is provided by the output impedance of transistor 217. As loop current varies depending on whether the network is on a short loop or a long loop, the output impedance of transistor 217 varies. That is, the output impedance goes lower as the current gets higher and goes higher as the current gets lower. Thus, on short loops the current is high and a low shunting impedance results. This lowers both the transmit signal out and the receive signal coming in. Similarly, on a long loop where current is low, the shunting impedance is high and does not shunt out the incoming receive signal or the outgoing transmit signal.

The other form of equalization in the speech network circuit is the equalization across the receiver 230. This equalization is also dependent upon loop current. As previously indicated, the current mirror transistor 215 has half of the loop current going through it. This current is repeated in transistor 216 at a lower ratio of one 21st of the current in transistor 215 or one 42nd of the total loop current. This current passes through a transistor-resistor array comprising transistors 231 and 232 and, resistors 233 and 234. On very long loops where loop current is low, the current in transistor 216 is low enough so that transistor 231 and 232 are not turned on. The current passes through resistors 233 and 234 without a sufficient voltage buildup on either to turn the transistors on. The resistive part of the impedance shunting the receiver in this case is the sum of resistors 233, 234, and 235 which is a fairly high impedance.

On short loops where the loop current is high, transistor 216 has a current high enough such that a voltage builds up first across resistor 234 and then secondly on the shortest loop across resistor 233 to where both diode-connected transistors 232 and 231 are respectively turned on. In the on state these transistors have low impedances. Thus, the resistive part of the shunting impedance across the receiver when both are on is the resistance of resistor 235.

A linear transducer such as an electret is used as a transmitter 240 with the active network circuit. The transmitter is coupled to an amplifier circuit 247 comprising transistors 242, 243, and 244 via transistor 241, transistor 241 being an emitter follower. Base current to transistor 241 is provided from the output of the transmitter 240. A series resistor 245 and a capacitor 246 couple the transmit signal from the emitter of transistor 241 to the base of transistor 242. This three-stage common emitter-amplifier circuit 247 provides amplification to the transmit signal in a manner similar to that of an operational amplifier. A feedback resistor 248 is coupled from the output of the amplifier, which is the collector of transistor 243, back to the base of transistor 242 for limiting the gain. The output of the amplifier is coupled to the input of capacitor 250 and resistor 249 to the Darlington pair transistors 210 and 211 where additional gain is provided to the signal before being transmitted over the tip and ring lines.

The active speech network is designed for use with tone generating dials such as are described in the co-pending U.S. applications "Electronically-Switched Multifrequency Generator for Providing Tone Signals"

by D. H. Nelson, Ser. No. 947,019, filed on Sept. 29, 1978 now U.S. Pat. No. 4,196,318, and "Electronically-Switched Multifrequency Generator with Transducer Control" by P. C. Davis et al., Ser. No. 103,403, filed concurrently herewith on Dec. 13, 1979. The speech network circuit receives two input signals from the tone generator 301. A first signal over input line 103 mutes the receiver 230 whenever a button is depressed on the dial keypad (not shown) indicating that tone generation is desired. A second signal over the line 104 inhibits the transmitter 240 during tone generation. The two signals provide for sequential switching of the transmitter 240 and receiver 230 to avoid undesirable clicks occurring in the receiver 230. Thus, when a button is depressed, the receiver is muted and then the transmitter is inhibited. After the button is released, which indicates a return to the speech condition, the sequencing is reversed in that the receiver is restored only after the transmitter has been enabled.

The operation of the switching elements in the active network circuit may best be presented in terms of a description of the circuit in changing between speech and dial modes of operation.

In the speech mode, line 103 is at common potential (line 102). Transistor 260 is active and current flows from the emitter of transistor 261 through resistor 262 to the emitter of transistor 260. The collector of transistor 261 is connected to the base of transistor 263 where it is drawing current. Transistor 263 is thus on and saturated, pulling the base of transistor 264 to its collector. Transistor 264 appears as a diode and provides a low resistance path around resistor 265. Therefore, the resistance in the signal path to the receiver 230 is low in the speech condition.

In the dialing mode, the signal over line 103 goes high, causing the base of transistor 260 to go high. Transistor 260 is turned off thereby and no current flows in resistor 262, which causes transistor 261 to also turn off. When transistor 261 turns off, transistor 263 also turns off and, in turn, turns off transistor 264. With transistor 264 off, the resistance in this link of the received signal path is increased to that of resistor 265, which causes the receiver output to be muted.

Line 104 is also at common when the tone generator is in the speech mode. This provides a current path from the emitter of transistor 270 to common. Transistor 270 is thus conducting and a current is established in transistor 272. The current flowing in transistor 272 has transistor 275 turned on and diode connected transistor 274 back biased. Since transistor 275 is on, its collector is low and transistor 276 is biased off. When transistor 276 is off, transistor 277 has no base drive and is also off.

When the tone generator 301 goes to the dial mode, line 104 goes high and current ceases to flow in transistor 272. Current flows in an alternate path, however, through resistor 278, transistors 274 and 275 to common. This raises the potential on the collector of transistor 274 approximately 2 $V_{be}$. This increased voltage appears across the base of transistor 276 and turns it on. The current flowing in transistor 276 provides sufficient base drive to saturate transistor 277. Saturation of transistor 277 places resistor 280 in parallel with resistor 281, lowering the resistance from line 101 to line 108.

A transmit-mute circuit 300 also has as its input the signal on line 104 from the tone generator 301. As earlier indicated, in the speech mode the line 104 is at common. In this mode, a base drive current is established in resistor 303 and transistor 304 is on. With transistor 304 on, a current repeater string comprising transistors 305 and 306 and resistors 307 and 308 is off. Since no current flows in transistor 306, transistor 309 is also off and the base of transistor 242 is allowed to vary with the signal coupled thereon from the transmitter via capacitor 246.

When the generator changes to the dial mode, line 104 goes high and hence transistor 304 turns off. With transistor 304 off, a reference current is set up by resistor 310 into transistor 305. This reference current in transistor 305 is repeated in transistor 306 and current flows via resistor 311 to transistor 309, raising its base voltage and turning it on. The collector of transistor 309 thus goes to common and pulls along with it the base of transistor 242, shutting it off. Shutting transistor 242 off achieves two things. The first is that the transmitter 240 is muted by shutting off the amplifier 247. In this amplifier, when the first transistor shuts off, it shuts off the second which, in turn, shuts off the third. The other thing that it accomplishes is that it conserves current in the dialing mode. Current that is used in this amplifier in the speech mode is available for the tone generator 301 in the dialing mode.

The active speech network circuit provides operating power from the tip and ring lines to its internal circuit elements and to the tone generator 301. There are two voltage levels available for use in the network and in other circuitry. The voltage level V1 exists at the common node point of capacitor 282, resistors 280 and 281, and the base of transistor 210. This is a low pass filtered tip ring voltage. The cut-off frequency of this RC filter when comprising resistor 281 and capacitor 282 is below 10 Hz so that any speech that is on the tip ring line is filtered out. This provides a voltage reference that is available for use in the other circuitry. Any current that is drawn from voltage level V1, however, is pulled through resistor 281 and tends to raise set voltage. Current from voltage reference V1 is thus limited to a low level.

A second voltage level V2 exists at the common node point of the base of transistor 211 and the emitter of transistor 210. This voltage has a much higher current capacity and is just 1 $V_{be}$ below voltage level V1. Also, voltage level V2 is regulated since voltage V1 is well filtered and voltage level V2 tracts voltage level V1. Moreover, transistor 210 is biased on so that any additional current drawn from its emitter will just be coming through its collector from line 101. Transistor 210 thus serves as a power supply as well as a portion of a common base amplifier circuit. The voltage V2 is used to power up the switching circuitry, the transmitter 240, and the transmitter amplifier 247. It is also a power supply for the tone generator 301.

In the dial mode the tone generator draws a fixed current from line 108 through the parallel combination of resistors 280 and 281 to raise the set voltage. In this way, the set voltage is raised without having to change the voltage on capacitor 282, which requires a finite time period. Thus, a means of raising the set voltage rather quickly is provided. This transition occurs in much less than a millisecond.

The dial enable circuit 320 determines whether the set voltage and current are of sufficient magnitude for the tone generator 301 to generate tone. The dial enable circuit keeps the dial logic turned off such that it cannot enter the dial mode until a favorable voltage and current determination is made. The voltage sensing is determined by a sensing circuit comprising transistors 321 and 322 and resistors 323, 324, and 325. If the V2 voltage level is sufficiently high, a voltage divider comprising resistors 324 and 325 will have a voltage high enough to turn on transistor 322. With transistor 322 turned on, transistor 321 is turned off. With transistor 321 turned off, the dial enable lead 105 is high and the tone generator 301 enabled.

The current sensing is determined by measuring the voltage drop across the resistor 213. This voltage drop signal is coupled over lines 106 and 107 to the dial enable circuit 320. The voltage drop on line 106 is approximately two $V_{be}$ above common and is much greater than the difference voltage. When this voltage drop is large enough, indicating that sufficient current exists for proper operation of the tone generator 301, the tone generator 301 is enabled. The voltage drops across resistors 330 and 331 set up currents which flow into a current repeater in transistors 332 and 333 and resistors 334 and 335. The current that comes into resistor 330 is repeated in transistor 333 and is subtracted from the current going into resistor 331. This subtraction is performed so that a difference current is produced and provided to the input of a diode connected transistor 336. This current is repeated in transistor 337 and coupled to a resistor string comprising resistors 338 and 339. When the difference current is of a sufficient magnitude, transistor 340 turns on, and current flowing to the base of transistor 341 through resistor 346, and to the base of transistor 345 through resistor 347 ceases, turning these transistors off. When transistor 341 turns off, current ceases in a voltage divider comprising resistors 342 and 343. This causes transistor 344 to also turn off, allowing the dial enable lead 105 to go high.

In the speech mode, line 103 is at common, such that before a sufficient current determination is made, transistor 341 is turned on by current flowing through resistor 348 to common. In the dial mode, however, line 103 goes to the V2 voltage level and transistor 341 is inhibited. With transistor 341 off, transistor 344 is also off, allowing the dial enable lead 305 to remain high in the dial mode. A wired OR circuit exists at the collectors of transistors 344 and 321 where one portion of the dial enable lead input is the voltage sense input and the other portion is the current sense input. Either insufficient voltage or current can prevent the dial enable lead from going to a high level and enabling the tone generator.

Some hysteresis is built into the dial enable circuit 320 such that when the current value is right at the threshold level, the circuit will not oscillate from one state to the other. This hysteresis is provided by transistors 340 and 345. When the current is at an insufficient level, transistor 345 is on, shorting out resistor 339. When the current increases to the point that transistor 340 turns on, transistor 345 is turned off. With transistor 345 in the off state, the resistance in the collector circuit of transistor 337 increases. Initially, this collector current had to build a $V_{be}$ across resistor 338. Once that threshold is reached and transistor 340 is activated, the $V_{be}$ must be maintained across both resistors 338 and 339, which requires less current after a favorable current determination is made. This creates the desired hysteresis for the circuit.

Although a specific embodiment of the invention has been shown and described, it will be understood that it is but illustrative and that various modifications may be made therein without departing from the scope and spirit of this invention as defined in the appended claims.

We claim:

1. An active speech network for a telephone set comprising a pair of line terminals (101, 102), current sensing means (330–343) for determining the level of current available from the line terminals, voltage sensing means (321–325) for determining the level of voltage available from the line terminals, the current sensing means providing a first control signal and the voltage sensing means providing a second control signal, the first control signal and the second control signal in combination providing an activation signal for enabling a tone generator (301).

2. The active speech network in claim 1 wherein the voltage sensing means includes a voltage divider network (324, 325) for determining a voltage magnitude at the midpoint of the divider network and coupling a reduced voltage reflective of this magnitude to a first transistor (322), the first transistor activating a second transistor (321) when the reduced voltage is greater than a predetermined value, the second transistor providing the second control signal for the tone generator.

3. The active speech network in claim 1 wherein the current sensing means comprises a first current mirror section including a first transistor (332) and a second transistor (333), the first transistor having a first input current level and providing an output current level to the second transistor reflective of the first current level, the second transistor providing a subtraction function and having as inputs a second input current level and the output current level of the first transistor, a difference current being coupled to a second current mirror section including a third transistor (336) and a fourth transistor (337), the third transistor having as its input the difference current, and the output current of the third transistor being duplicated in the fourth transistor.

4. The active speech network in claim 3 wherein the current sensing means further comprise hysteresis means (338–340, 345, 347) for controlling the period of application of the activation signal.

5. The active speech network in claim 4 wherein the hysteresis means include two transistors (340, 345), the control electrode of the first transistor (340) and a resistor divider network (338, 339) being coupled to the output of the second current mirror section, the first transistor having its output electrode coupled to the input electrode of the second transistor (345), the output electrode of the second transistor being connected to the common point of the resistor divider network.

6. The active speech network in claim 5 wherein the second transistor in the hysteresis means provides an output signal to a fifth transistor (341) and the fifth transistor providing an output signal to a sixth transistor (344), the sixth transistor providing the first control signal for the tone generator.

7. The active speech network in claim 1 wherein the current sensing means include a voltage difference threshold circuit for measuring the difference between a higher and a lower source voltage, each source voltage being connected through a resistor to a transistor current repeater, the first transistor current repeater (332) being connected to the higher voltage and having its collector and base electrodes commonly connected to the base of the second transistor current repeater (333) the collector of the second transistor current repeater being connected to the lower voltage source and providing a differential output voltage, the emitter electrodes of the first and second transistor current repeaters being commonly connected to a reference voltage level.

8. The active speech network in claim 7 wherein the current sensing means further comprise hysteresis means (338-40, 345, 347) for controlling the period of application of the activation signal.

9. The active speech network in claim 8 wherein the hysteresis means include two transistors (340, 345), the control electrode of the first transistor (340) and a resistor divider network (338, 339) being coupled to the output of a current mirror section (336, 337), the first transistor having its output electrode coupled to the input electrode of the second transistor (345), the output electrode of the second transistor being connected to the common point of the resistor divider network and the output of the second transistor current repeater being connected to the current mirror section.

10. The active speech network in claim 9 wherein the second transistor in the hysteresis means provides an output signal to a third transistor (341) and the third transistor providing an output signal to a fourth transistor (344), the fourth transistor providing the first control signal for the tone generator.

11. An active speech network for a telephone set comprising a pair of line terminals (101, 102), a variable impedance element (217) connected across the line terminals and varying its impedance inversely with the dc voltage change across the line, the variable impedance element being responsive to a control element (210-215) connected across the line terminals, the control element including a Darlington pair transistor forming the first in a string of series-connected transistors for providing a voltage reference, an increase in the line voltage above the reference causing the variable impedance element to decrease and a decrease in the line voltage below the reference causing the variable impedance element to increase.

12. The active speech network in claim 11 wherein the variable impedance element comprises a transistor (217) having an emitter and a collector electrode which are connected across the line terminal.

13. The active speech network in claim 12 wherein the control element includes the Darlington pair transistor arranged (210, 211) with the base-collector electrodes connected across the line terminals, the emitter electrode forming the first in a series connection of a diode (212), a resistor (213) and a second and third transistor (214, 215), the third transistor having its emitter electrode connected to one of the line terminals and its collector electrode providing a biasing means to the variable impedance element to cause the variable impedance element to maintain a constant voltage across the line terminals.

14. The active speech network in claim 13 wherein the Darlington pair transistor operates as amplifying means.

15. An active speech network for a telephone set comprising a pair of line terminals (101, 102) with a specific level of voltage and current available, a resistance network (280, 281) serially connected with a capacitor (282) across the line terminals, the resistance network and capacitor in combination with a control element (210-215) providing a first dc voltage level with the active speech network in a first operating condition and a second dc voltage level with the active speech network in a second operating condition.

16. The active speech network of claim 15 wherein in the first operating condition, the series resistance of the resistance network is a first value and in the second operating condition, the series resistance of the resistance network is a second lower value.

17. The active speech network in claim 16 wherein the resistance network includes a first and a second resistor (280, 281) commonly connected to the capacitor, the first resistor being in series combination with the collector electrode of a transistor (277) and the emitter electrode of the transistor being in series combination with the second resistor, the transistor providing switching means where in the first operating condition, the second resistor comprises the series resistance of the resistance network and in the second operating condition, the parallel combination of the first and second resistor comprise the series resistance of the resistance network.

18. An active speech network for a telephone set comprising a pair of line terminals (101, 102), and a resistance network (280, 281) serially connected with a capacitor (282) across the line terminals, the resistance network and capacitor in combination with a Darlington pair transistor (210, 211) with its base-collector electrodes connected across the terminals alternatively providing a first and a second regulated dc voltage for providing power to a line powered tone generator, the change between the voltage levels occurring in response to a change in the impedance of the resistance network and without having to change the voltage on the capacitor providing a regulated dc voltage for providing power to a line powered tone generator (301).

19. The active speech network of claim 18 wherein the first and the second regulated dc voltages are obtained from the internal common emitter-base node connection of the Darlington pair transistor.

20. An active speech network for a telephone set comprising a pair of line terminals (101, 102), amplifying means (210, 211) connected across the terminals, sidetone balancing means (111, 112) connected to the amplifying means, a receiver (230), a transmitter (240), means connecting the transmitter between one of the line terminals and a terminal of the amplifying means, and means connecting the receiver between the sidetone balancing means and terminal of the amplifying means common with the transmitter, characterized in that the active network includes current sensing means (330-348) for determining the level of current available from the line terminals, voltage sensing means (321-325) for determining the level of voltage available from the line terminals, the current sensing means providing a first control signal and the voltage sensing means providing a second control signal, the first control signal and the second control signal in combination providing an activating signal for enabling a tone generator (301).

21. The active speech network in claim 20 wherein the voltage sensing means includes a voltage divider network (324, 325) for determining a voltage magnitude at the midpoint of the divider network and coupling a reduced voltage reflective of this magnitude to a first transistor (322), the first transistor activating a second transistor (321) when the reduced voltage is greater than a predetermined value, the second transistor providing the second control signal for the tone generator.

22. The active speech network in claim 20 wherein the current sensing means comprises a first current mirror section including a first transistor (332) and a second transistor (333), the first transistor having a first input current level and providing an output current level to the second transistor reflective of the first current level, the second transistor providing a subtraction function and having as inputs a second input current level and the output current level of the first transistor, a difference current being coupled to a second current mirror section including a third transistor (336) and a fourth transistor (337), the third transistor having as its input the difference current, and the output current of the third transistor being duplicated in the fourth transistor.

23. The active speech network in claim 22 wherein the current sensing means further comprise hysteresis means (338-340, 345, 347) for controlling the period of application of the activation signal.

24. The active speech network in claim 23 wherein the hysteresis means include two transistors (340, 345), the control electrode of the first transistor (340) and a resistor divider network (338, 339) being coupled to the output of the second current mirror section, the first transistor having its output electrode coupled to the input electrode of the second transistor (345), the output electrode of the second transistor being connected to the common point of the resistor divider network.

25. The active speech network in claim 24 wherein the second transistor in the hysteresis means provides an output signal to a fifth transistor (341) and the fifth transistor providing an output signal to a sixth transistor (344), the sixth transistor providing the first control signal for the tone generator.

26. The active speech network in claim 1 or 20 wherein the current sensing means include a voltage difference threshold circuit for measuring the difference between a higher and lower source voltage, each source voltage being connected through a resistor to a transistor current repeater, the first transistor current repeater (330) being connected to the higher voltage and having its collector and base electrodes commonly connected to the base of the second transistor current repeater (333) the collector of the second transistor current repeater being connected to the lower voltage source and providing a differential output voltage, the emitter electrodes of the first and second transistor current repeaters being commonly connected to a reference voltage level.

27. The active speech network in claim 20 further comprising attenuation means (231-235) for an ac signal that is coupled from the line terminals to the receiver, the attenuation means being bridged across the receiver and including a first transistor (232) having its base and collector commonly connected to both one side of the receiver and a first resistor (234), and its emitter connected to the other side of the first resistor so that a voltage buildup across the first resistor activates the first transistor placing it in a low impedance condition such that the ac signal freely passes therethrough attenuating the signal level present across the receiver.

28. The active speech network in claim 27 wherein the attenuation means further comprise a second transistor (231) having its base and collector commonly connected to both the emitter of the first transistor and one side of a second resistor (233), and its emitter connected to the other side of the second resistor so that a voltage buildup across the second resistor activates the second transistor placing it in a low impedance condition such that the ac signal freely passes therethrough, the first transistor being activated at a first voltage level and the second transistor being activated at a second higher voltage level, and the first and second transistor when both activated combining to form a low impedance series path for the ac signal for attenuating the signal level present across the receiver.

* * * * *